United States Patent
Richter et al.

(10) Patent No.: US 12,231,164 B2
(45) Date of Patent: Feb. 18, 2025

(54) SMARTDUST CHIP

(71) Applicants: Wolfgang Richter, Vancouver (CA); Faranak Zadeh, Vancouver (CA)

(72) Inventors: Wolfgang Richter, Vancouver (CA); Faranak Zadeh, Vancouver (CA)

(73) Assignee: EPIC SEMICONDUCTORS INC

( * ) Notice: Subject to any disclaimer, the term of this patent is extended or adjusted under 35 U.S.C. 154(b) by 221 days.

(21) Appl. No.: 18/070,500

(22) Filed: Nov. 29, 2022

(65) Prior Publication Data

US 2023/0170992 A1    Jun. 1, 2023

Related U.S. Application Data

(60) Provisional application No. 63/284,539, filed on Nov. 30, 2021.

(51) Int. Cl.
*H04B 10/114* (2013.01)
*G06K 19/07* (2006.01)

(52) U.S. Cl.
CPC ..... *H04B 10/1149* (2013.01); *G06K 19/0725* (2013.01)

(58) Field of Classification Search
CPC .......................... H04B 10/1149; G06K 19/0725
USPC ..................................................... 398/127
See application file for complete search history.

(56) References Cited

U.S. PATENT DOCUMENTS

| | | | |
|---|---|---|---|
| 2011/0074349 A1* | 3/2011 | Ghovanloo | H02J 50/80 320/108 |
| 2012/0293006 A1* | 11/2012 | Kim | H04B 5/72 307/104 |
| 2016/0356866 A1* | 12/2016 | Attridge | G01R 33/0052 |
| 2020/0220576 A1* | 7/2020 | Richter | H04B 5/79 |
| 2023/0138506 A1* | 5/2023 | Zou | H02J 50/27 307/104 |
| 2023/0369896 A1* | 11/2023 | Suarez Sandoval | H02J 50/12 |

* cited by examiner

*Primary Examiner* — Dalzid E Singh

(57) ABSTRACT

Disclosed is a SmartDust system for contactless digital controlled serialized analog processing of analog values received from an object. The SmartDust system includes a hub unit and at least one electronic circuitry capacitive coupled to the hub unit. The hub unit includes an oscillator for generating a frequency, and a first electrode connected to the oscillator to emit the frequency as an alternating electric field. The electronic circuitry stores and performs switching instructions and the digital logic operations. The electronic circuitry receives analog values and generate sampled and processed analog values. The electronic circuitry provides the processed values to external components. The hub unit includes a controller for providing the switching instructions and the digital logic operations to the electronic circuitry, and a modulator for modulating the alternating electric field with the switching instructions and the digital logic operations.

17 Claims, 2 Drawing Sheets

SMARTDUST CHIP

CROSS REFERENCE TO RELATED APPLICATION

This application claims priority to a U.S. Provisional Application No. 63/284,539 filed on Nov. 30, 2021, the entire contents of which are incorporated herein by references in its entirety.

BACKGROUND OF THE INVENTION

1. Field of the Invention

The present invention generally relates to analog computing, and more particularly relates to a smart dust to power contactless wireless operating sensors and computing devices via electron entanglement.

2. Description of Related Art

A computer is a device that transforms data into meaningful information. It processes the input according to the set of instructions provided to it by the user and gives the desired output. Computers are categorized in two ways i.e. size and data handling capabilities. Three types of computers are known to categorized on the basis of data handling capabilities i.e. Analogue Computer, Digital Computer, and Hybrid Computer.

Continuous data that changes continuously and cannot have discrete values is called analog data. So, an analog computer is used where we don't need exact values or need approximate values such as speed, temperature, pressure etc. It can directly accept the data from the measuring device without first converting it into numbers and codes. It measures the continuous changes in physical quantity. It gives output as a reading on a dial or scale. For example: speedometer, mercury thermometer, etc.

Analog computing is a form of parallel processing. The parallel processing is limited by the number of computing elements that can be patched together. Also, only one complex problem can be solved at a time without changing the configuration. Yet, there is no need to solve mathematical formulas parallel (other than a time factor). In fact, they are normally sequentially calculated following the order of operation rules (PEMDAS). The invention introduces a new way of rapidly configurable analog computing with just a single differential computing element (operational amplifier (OP-Amp), OP).

It has been a real challenge to power contactless and wireless operating sensors and/or computing devices. Usage of batteries is limited and does not provide continuous sensing. The batteries are restricted and most of the times requires continuous charging or replacement of battery. Innovation has been started to create electronic circuits on nanoscale, termed as SmartDust.

Therefore, there is a need of a system for contactless digital controlled serialized analog processing of analog values. Further, the system should be able to power the electronic circuitry wirelessly over the air via electron entanglement caused by an external provided alternating electric field. Furthermore, the system should create temporally sensing elements for environmental changes that can be sampled, filtered, amplified and processed.

SUMMARY OF THE INVENTION

In accordance with teachings of the present invention, a SmartDust system for contactless digital controlled serialized analog processing of analog values received from an object.

An object of the present invention is to provide the SmartDust system with a hub unit and at least one electronic circuitry capacitive coupled to the hub unit. The hub unit is further attached to the object. The hub unit includes an oscillator for generating a frequency, and a first electrode connected to the oscillator to emit the frequency as an alternating electric field.

The electronic circuitry includes a second electrode for receiving the emitted alternating electric field via the first electrode, a rectifier is coupled to the second electrode for converting charges of the alternating electric field into a DC voltage, a buffer for storing the DC voltage, a Schmitt trigger for converting the frequency into a system clock, a digital function block for performing digital logic operations, a sequencing unit is coupled to the digital function block to store and perform switching instructions and the digital logic operations.

Further the electronic circuitry includes an arrangement of transmission gates operating on the switching instructions from the sequencing unit, an arrangement of Sample & Hold units samples and hold analog values under control of the sequencing unit, at least one input pad receives the analog values from the object and further the input pad provides the received analog values to the Sample & Hold units to generate sampled analog values, a differential unit to process the sampled analog values.

Further, the differential unit communicates the processed analog values for further processing in a sequence to at least one of the Sample & Hold unit and the digital function block, at least one digital analog output pad for providing the processed values received from at least one of the differential unit and the digital function block to external components.

Further, the electronic system includes an arrangement of analog units for configuring the differential unit with the switching instructions under control of the sequencing unit and a first modulator coupled to at least one of the differential unit, and the digital function block to modulate the alternating electric field with the processed values.

Another object of the invention is to provide the SmartDust system wherein the hub unit further includes a controller for providing the switching instructions and the digital logic operations to the digital function block.

Another object of the invention is to provide the hub unit with a second modulator for modulating the alternating electric field with the switching instructions and the digital logic operations. The first electrode emits the modulated alternating electric field to be received by the second electrode.

Another object of the invention is to provide the hub unit with an interface to communicate with the first modulator to receive the processed values. Further, the interface communicates the receive processed values over a communication network. Further, the electronic circuitry includes at least one digital input pad for receiving logic levels, instructions and parameters from external digital electronics.

Another object of the present invention is to provide with the electronic circuitry with a power output for powering the external digital electronics. Further, the digital function block controls the external digital electronics. Further, the electronic circuitry includes a power output for powering the external digital electronics.

Another object of the present invention is to provide the SmartDust system with a detector for decoding the processed values received via the modulated alternating electric field from the first modulator. Further the detector is attached to the hub unit. Further, the differential unit creates a Round Robin Loop with the Sample & Hold unit and the digital function block under control of the sequencing unit.

Another object of the present invention is to provide the rectifier with a ESD clamping to each input pad and each digital analog output pad. Further, the electronic circuitry includes a floating electrode. Further, the SmartDust system includes a surface as a third electrode coupling with the floating electrode.

Another object of the present invention is to provide multiple electronic circuitries. Each electronic circuitry powers, clocks, controls and communicates with the other connected electronic circuitries. Further, the digital function block provides a unique identification code for each object in reach.

Another object of the present invention is to provide one or more infra-red light emitting diodes connected to the electronic circuitries for releasing warm optical signals. Further, the controller identifies the object by identifying the unique identification code.

The devices disclosed herein avoid many of the drawbacks of existing devices which rely on generation old technology for sensing of analog values. Embodiments of the present invention provide for a SmartDust as described and defined in the description below and in the annexed claims which provide for improved sensing, setup, and retention characteristics in order to contactless digital controlled serialized analog processing of analog values in a multitude of environments.

The foregoing presents a simplified summary of the present disclosure in a simplified form as a prelude to the more detailed description that is presented herein. Therefore, to achieve the foregoing and other objects and in accordance with the purposes and embodiments of the present invention, as embodied and described herein, there is provided a SmartDust system.

These and other features, aspects, and advantages of the present invention will become better understood with reference to the following description and appended claims.

BRIEF DESCRIPTION OF DRAWINGS

Illustrative embodiments of the present invention are described herein with reference to the accompanying drawings, in which.

DETAILED DESCRIPTION OF DRAWINGS

Figure 1:
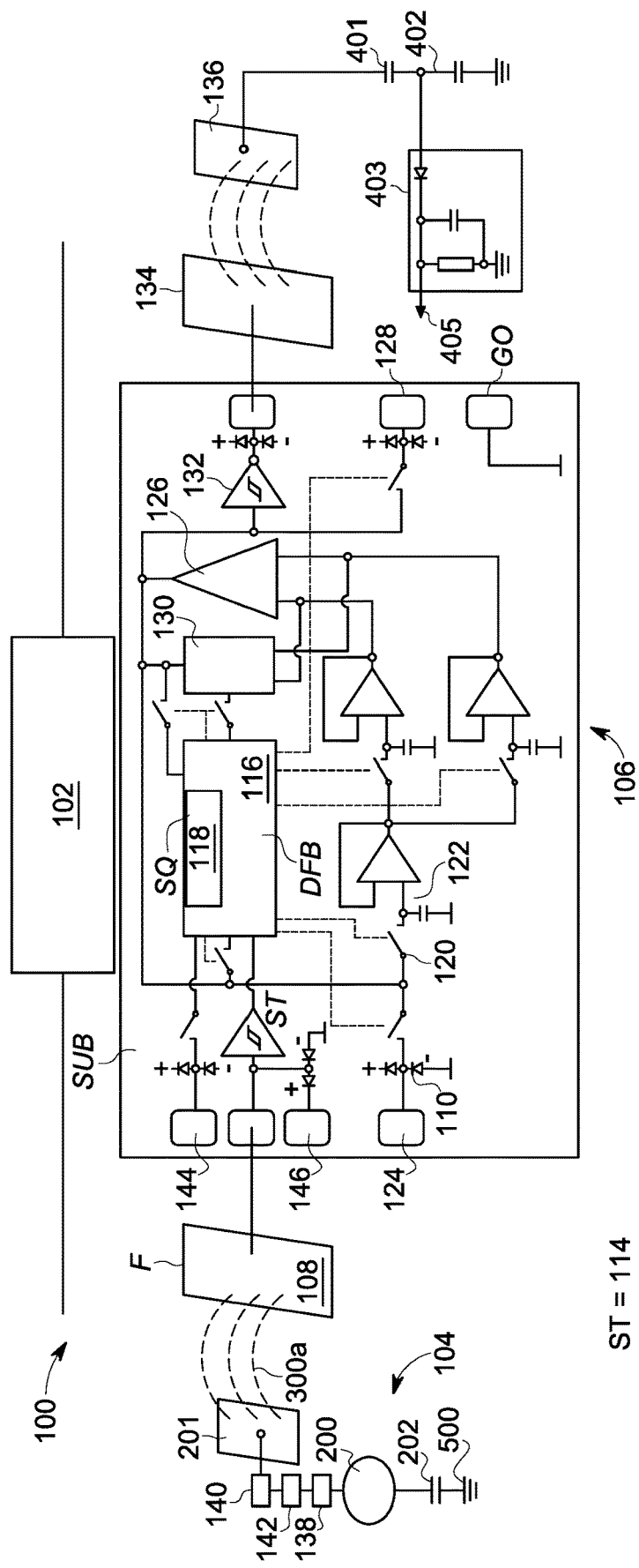
FIG. 1 illustrates a block diagram of a SmartDust system in accordance with an embodiment of present invention.

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

Reference will now be made in detail to the present preferred embodiments of the invention, examples of which are illustrated in the accompanying drawings. Wherever possible, the same reference numerals are used in the drawings and the description to refer to the same or like parts.

FIG. 1 illustrates a block diagram of a SmartDust system 100 in accordance with an embodiment of present invention. The SmartDust system 100 provides contactless digital controlled serialized analog processing of analog values. The analog values are received from an object 102. The SmartDust system 100 includes a hub unit 104, and an electronic circuitry 106.

The electronic circuitry 106 is attached to the object 102 and capacitive coupled to the hub unit 104. The hub unit 104 includes an oscillator 200 for generating a frequency, and a first electrode 201 is connected to the oscillator 200 to emit the frequency as an alternating electric field 300a.

The electronic circuitry 106 includes a second electrode 108, a rectifier 110, a buffer 112, a Schmitt trigger 114, a digital function block 116, a sequencing unit 118, an arrangement of transmission gates 120, an arrangement of Sample & Hold units 122, at least one input pad 124, a differential unit 126, at least one digital analog output pad 128, an arrangement of analog units 130, and a first modulator 132.

The second electrode 108 for receiving the emitted alternating electric field via the first electrode 201. The second electrode 108 receives the alternating electric field over a medium (e.g. air, liquids, metals, crystals, gases, materials, polymers, etc.). The rectifier 110 is coupled to the second electrode 108 for converting charges of the alternating electric field into a DC voltage. The buffer 112 for storing the DC voltage. Examples of the rectifier 110 include but not limited to diodes, Graetz Bridge, phase controlled switches, etc.

The Schmitt trigger 114 converts the frequency into a system clock. Examples of the Schmitt trigger 114 include but not limited to invertor gate, comparators, transistor circuit, etc. The digital function block 116 performs digital logic operations. Examples of the digital function block 116 include but not limited to a phase locked loop (PLL), field strength controlled oscillator (FCO), phase comparator, timer block, Turing machine, digital perceptrons, latches, shift registers, buffers, Arithmetic blocks, unique identifiers, encryption blocks, SPI, beacons, Arithmetic logic unit, (De-)multiplexers, Industrial control unit (ICU), counters, logic gates, Industrial Control Unit (ICU) etc.

The sequencing unit 118 is coupled to the digital function block to store and perform switching instructions and the digital logic operations. Examples of the sequencing unit 118 include but not limited to combination of a counter, register, (De-) multiplexers, RAM (non-volatile) memory, integrated processors, etc. The arrangement of transmission gates 120 are operating on the switching instructions from the sequencing unit 118. Examples of the transmission gates 120 include but not limited to MOS switches, transistors, opto-coupler, logic gates, tri-state gates etc.

The arrangement of Sample & Hold units 122 sample and hold analog values under control of the sequencing unit 118. The Sample & Hold units 122 to sample and hold analog values under control of the sequencing unit 118. Example of the Sample & Hold units 122 include but not limited to combination of a transmission gates, buffer amplifier with input capacitors, and virtual ground, etc.

The input pad 124 receives the analog values from the object 102. The input pad 124 provides the received analog values to the Sample & Hold units 122 to generate sampled analog values. Examples of the input pad 124 include but not limited to a bonding pad, BGA, IC-pin for accepting analog voltage values or current, etc.

The differential unit 126 processes the sampled analog values. Further, the differential unit 126 communicates the processed analog values in a sequence for further processing to at least one of the Sample & Hold unit 122 and the digital function block 116. Examples of the differential unit 126 include but not limited to differential transistor amplifier with constant current source, operational amplifier circuits, Gilbert cell, analog multiplier, instrumentation amplifier, transistor arrangement etc.

The digital analog output pad 128 for providing the processed values received from at least one of the differential unit 126 and the digital function block 116, to external components. Examples of the digital analog output pad 128 include but not limited to bonding pad, BGA, IC-pin for conducting analog/digital voltage levels or currents, etc.

The analog units 130 configures the differential unit 126 with the switching instructions under control of the sequencing unit 118. The first modulator 132 is coupled to at least one of the differential unit 126 and the digital function block 116 to modulate the alternating electric field with the processed values. For example, the first modulator 132 changes the impedance accordingly. Examples of the first modulator 132 include but not limited to transistor emitter circuit, NMOS transistors, complementary transistors, logic gates, etc.

Further, the electronic circuitry 100 includes a floating electrode 134 coupling to ground or other surfaces influenced by the object 102. Further, the floating electrode 134 is able to transmit the modulated alternating electric field received from the electronic circuitry 106 to the detector via a third electrode 136. In an embodiment, the third electrode 136 is represented either as a surface or an object.

In an embodiment, the hub unit 104 includes a controller 138 for providing the switching instructions and the digital logic operations to the digital function block 116. Examples of the controller 138 include but not limited to a microprocessor, FPGA, a microcontroller, and other similar computing devices.

Further in an embodiment, the hub unit 104 includes a second modulator 140 for modulating the alternating electric field with the switching instructions and the digital logic operations. The first electrode 201 emits the modulated alternating electric field to be received by the second electrode 108. Examples of the second modulator 140 include but not limited to transistor emitter circuit, NMOS transistors, complementary transistors, logic gates, etc.

Further in an embodiment, the hub unit 104 includes an interface 142 to communicate with the first modulator 132 to receive the processed values. Further the interface 142 communicates the receive processed values over a communication network. Examples of the interface 142 include but not limited to Bluetooth, internet, CDMA, Wi-fi, Li-Fi, IR, ultrasound, NFC, audio, display, and similar peripheral devices, etc.

Further in an embodiment, the electronic circuitry 106 further includes at least one digital input pad 144 for receiving logic levels, instructions and parameters from external digital electronics. The digital values on the digital input pad 144 are processed with the integrated programmable logic controller 138. Examples of the digital input pad 144 includes but not limited to bonding pad, BGA, IC-pin for conducting digital logic levels, etc.

Furthermore, the external digital electronics are controlled by the digital function block 116. In an embodiment, the electronic circuitry 106 further includes a power output (V+) 146 for powering the external digital electronics. Examples of the external digital electronics include but not limited to peripherals, sensors, controllers, memory, signaling, transmitters, etc.

In an embodiment, the system 100 further includes a detector 403 for decoding the processed values received via the modulated alternating electric field from the first modulator 132. In an embodiment, the detector 403 is able to communicate the processed values from the first modulator 132 to computing devices.

Further in an embodiment, the detector 403 is attached to the hub unit 104 via a connector 405. Examples of the detector 403 include but not limited to AM, FM, IQ, PSK, etc. Filter amplifier, digitizers, etc. In an embodiment, the rectifier 110 provides ESD clamping to each input pad 124 and each digital analog output pad 128. The differential unit 126 creates a Round Robin Loop with the Sample & Hold unit 122 and the digital function block 116. The Round Robin Loop is created under control of the sequencing unit 118.

The Round Robin Loop allows multiple or technically infinite use of only a few required components. The Sample & Hold (S&H) units 122 are connected in a series of two that accepts voltage levels via transmission gate switches. The two S&H are placed in series to change configuration of the differential unit 126 during a clock cycle without affecting the previously sampled value.

The routing is controlled by commands stored in the sequencing unit 118, which are provided via the alternating electric field from the controller 138 in the forms of gaps and counts between gaps (external operation codes, XOPs). Further, the analog block e.g. has a voltage divider made from two resistors that divide applied voltages by two or in combination with a third resistor create voltage levels of 10% and 90%.

Repeated routing provides any other voltage level. For example, if 5V is applied to the 10% output, 500 millivolts are sampled. If this value is sampled and sent to the same 10% output, 50 millivolts is created, which is only 1% of the original voltage. The three resistors and routing looping over the sample and hold circuits, are able to create any desired voltage level.

The same feature is done with capacitors in a similar arrangement to temporarily route of filter circuits (LP, HP, BP, notch, etc.). Further, the capacitors are used for integration and differentiation of sampled voltage levels combination with the differential unit 126. The filter links are either passive or active. In one embodiment, a virtual ground potential may also be sampled and lead to one of the differential units 126 or the analog components. Further, the analog components are configured to provide coefficients for mathematical operations or weights for machine learning features.

The external provided alternating electric field is received by the floating electrode 136. The floating electrode 136 is connected to an integrated Schmitt trigger 114 that converts the sine wave into a rectangle signal to provide a system clock. Further, the alternating electric field energy is rectified with a rectifier 110 (e.g. Graetz bridge or ideal diodes, MOS switches, etc.) built from the ESD diodes that are integrated on any input/output pad of the electronic circuitry.

The provided electric field floats over the floating electrode 134 capacitive 401 back to the ground 402. The first modulator 132 (phase shifter) is added to create a phase shift between both electrodes which results in a harvested higher voltage level. The digital function block 116 is operated by the system clock and external commands that are modulated into the alternating electric field by the controller 138.

The sequencing unit 118 is loaded with switching instructions to operate transmission gates to configure the differential unit 126 with various analog components to perform a desired analog process. Examples of the analog components include but not limited to a resistor, capacitor and diodes etc. With the switching any kind of computing operational amplifier is created from simple inverting, multipliers, attenuators, integrators, differentiators, logarithmic, adders, substractors, comparators, oscillators, etc.

From the input pad 124, analog signals are routed to a first sample and hold circuit 122 and further connected to another of two sample and hold circuits. Further, the first sample and hold circuit 122 is connected to other two sample and hold circuits are connected either to the positive or negative inputs of the differential unit and the analog component block. The sequencing unit 118 operates the switching and route analog signals from the differential unit 126 into the digital function blocks e.g. analog/digital or digital/analog conversion.

Figure 2:
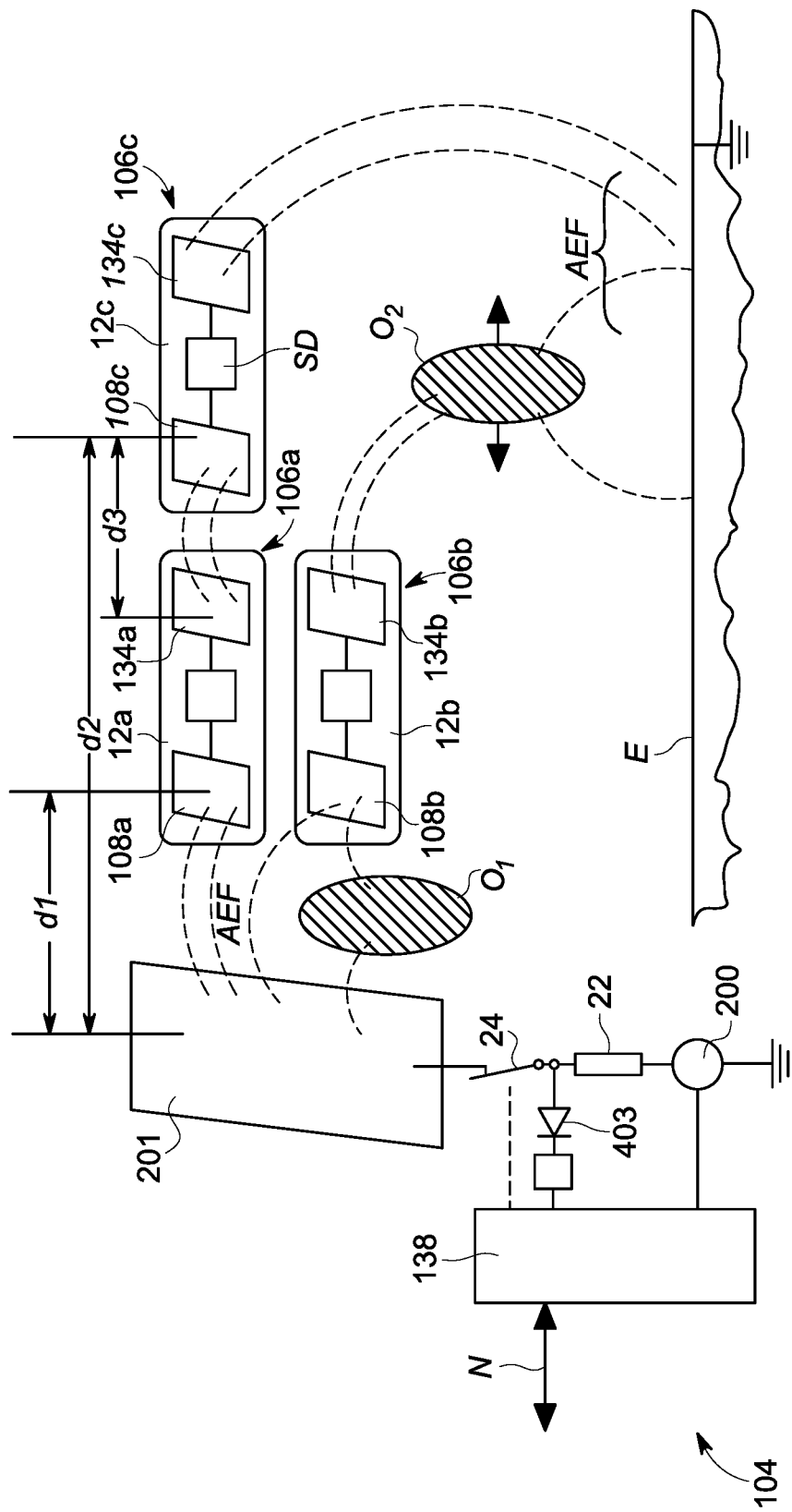
FIG. 2 illustrates a schematic diagram to show arrangement of multiple electronic circuitry on multiple objects.

FIG. 2 illustrates a schematic diagram to show arrangement of electronic circuitry 106a, 106b & 106c attached on substrates (SUB) 12a, 12b & 12c, respectively. The electronic circuitries 106a, 106b & 106c are arranged at a distance to an alternating electric field emitted first electrode 201. The electronic circuitries 106a, 106b & 106c provides parallel computing if the sequencing units of each electronic circuitries are loaded with related switching instructions.

In an embodiment, the hub unit 104 further includes a level shifter 22 and an electronic switch 24. The level shifter 22 and the electronic switch 24 together put gaps into the provided alternating electric field. The alternating electric field (AEF) is coupled over the air with the electronic circuitries in reach via second electrodes 108a, 108b & 108c for harvesting electrical energy, clock and information from the modulated alternating electric field via electron entanglement. The electron entanglement is a dynamic form of capacitive coupling over a medium (e.g. air, dielectric, liquids, etc.).

The electronic circuitries couple back to the earth's ground with their electrodes 136a, 136b & 136c at the same location of the earth's ground (E), resulting in the electrical AC circuit. The controller 138 has the ability to communicate with networks (N). Examples of the networks include but not limited to LAN, WLAN, computers, smart devices or other microcontrollers, FPGAs, etc.

Plurality of electronic circuitries 106 may operate parallel in the same field. Further, the electronic circuitry 106 is able to detect the distance from the first electrode 201. For example, the electronic circuitry 106a identifies distance d1 from the first electrode 201 by converting the field strength into adequate signal. The adequate signal is then communicated to the controller 138.

Further, the signal is used to determine a communication channel e.g. a carrier frequency for the modulation of processed analog values. It is apparent to those skilled in the art that the communication channel may change with the distance and avoids data collision between the electronic circuitries 106a, 106 & 106c, without deviating from the scope of the present invention.

The electronic circuitry 106 provides a unique identification code for each object in reach. The controller 138 is able to identify the object or the electronic circuitry with the help of the unique identification code, regardless of the transmission channel.

Similarly, distance d2 is measured by the third electronic circuitries 106c, and distance d3 is measured either by the first electronic circuitry 106a or the third electronic circuitry 106c. Object O1 is placed between the second electronic circuitry 106b and the first electrode 201. Further an Object O2 is placed between the second electronic circuitry 106b and the ground. The objects O1 & O2 are detected and analyzed by one or more electronic circuitries.

The system exhibits spectrum analytics where the oscillator 200 sweeps a frequency in a certain range and the objects are influenced by the alternating electric field. The objects may resonate or attenuate the alternating electric field at certain points and frequencies that is either detected and analyzed from the electronic devices.

Various features of the objects are analyzed such as quality of food, water, or other liquids or structures. The objects may either be static between the first electrode and the electronic circuitry, or move dynamically in reach of the alternating electric field. The system is able to monitor/track the speed, direction and physical proportions of the objects. Further, the system is able to identify the objects.

The digital function block (field controlled oscillator) is able to create dynamic identifiers or communication channels depending on the distance from the field emitting electrode. Several digital sub-circuits are integrated in the electronic circuitry. The sub-circuits (=modules) of the digital function block (DFB) may e.g. be described and commented in Verilog language and compiled into netlists and chip layouts.

```
module ICU (in,out,cmd,clock); // performs sequential logical // // 1 bit
operations
input in;        // digital input e.g from a multiplexer
input clock;     // system clock derived from eField frequency
output out;      // digital output e.g to a demultiplexer
input [1:0] cmd; // operation command (from Sequencer)
reg R;           // register stores last result (D-FlipFlop)
assign out = R;  // output the register always @(posedge (clock)) //
operation starts if clock shifts // // from low to high begin case(cmd) //
operation commands are numbered 0 : R <= R|in; // performs logical "or"
operation with R
  1 : R <= R∈ // performs logical "and" operation with R
  2 : R <= R^in; // performs logical "xor" operation with R
  3 : R <= R~in; // performs logical "not" operation with R
  endcase
end
endmodule
```

The digital function block may include either individually or in combination of a phase locked loop (PLL), field strength controlled oscillator (FCO), phase comparator, timer block, Turing machine, latches, shift register, digital buffers, unique identifiers, arithmetic blocks, SPI and/or I2C blocks, beacon, (De-) multiplexers, arithmetic logic unit, and industrial control unit (ICU).

The phase locked loop (PLL) for allowing to practically derive or generate any frequency from a provided system clock. The field strength controlled oscillator (FCO) converts the energy of the alternating electric field in reach into a frequency. This is useful to detect distances or movements (e.g. gestures) of an object in reach.

The phase comparator supports the generation of frequencies or decoding of digital information. The timer block creates time intervals, modulation- and shift clocks or any desired interval or rhythm. The "Turing machine block" performs computation with the external provided commands and parameters. Therefore, no internal RAM and ROM is needed which saves billions of transistors in the circuit as well as electrical energy. Other blocks form digital perceptrons or elements of convolutional neural networks (CNN) or elements of machine learning (ML).

The Latches (FlipFlops) may be integrated to hold digital values from the inputs and the outputs or as results of computation and calculations. The shift register may be implemented to shift data, values and information digitally in and out or change serial- to parallel conversion and vice versa.

The digital buffers may be integrated to have higher Fan-in and Fan-out if necessary. The digital function block may also contain unique identifiers and methods for de- and encryption of data. The arithmetic blocks may be added for mathematical performing tasks. The SPI and/or I2C blocks performs serial communication with selectable bit- and baud rates. The Beacon generator is able to output configurable Morse code like signals.

The (De-) multiplexers route voltage levels between inputs, outputs, and the integrated circuitry of the digital function block (DFB) or the analog parts. The arithmetic logic unit (ALU) performs logical and mathematical operations. The Industrial control unit (ICU) work as programmable logic controller (PLC), where only few digital gates are necessary to replace a complete programmable logic controller.

The ICU is able to perform one bit operations with a value stored in a register flip flop (R). Examples of the operations are AND, OR, NOT, XOR, which are required in a digital conversation. The multiplexer is connected to a digital input pad off the electronic circuitry to select one of many digital values as input for the ICU sub-circuit. The selection of digital values is done with external operation or via the information in the sequencing unit.

The sequencing unit further contains the performing command and an address for a de-multiplexer on the output. This enables the sequencing unit to perform so-called ladder operations known from the controllers of CNC machines and 3D printers, robotics, vehicle control, plotters, laser cutters, medical or military devices, as well as industrial automation.

A typical command would be "output 5=input 3 AND input 4" (in short" 5=3&4). The ICU would get information from the sequencer to store a value from input 3 into the Register R and make a logical "AND" operation with input 4 and Register R and output Register R to the output 5 which may be latched to hold a value.

The sequencing unit may hold more commands and because of the input and output latching they appear as parallel operations even if the latching is actual serial performed. The simple feature replaces a complex microcontroller, as the sequencing unit is integrated in the electronic circuitry. The sequencing unit works contactless and wirelessly.

Appended are the Invention-Related Applications—

Automotive: The electronic circuitry is attached on a flexible carrier inside a vehicles seat to detect occupancy and position of passengers as well as the movements. Further, the electronic circuitry is able to identify passengers during their action such as 3D gestures from limbs, hands, fingers and head movement etc., as the electronic circuitry is able to replace conventional buttons and save cables, wires and connectors or make individualized button arrangements on the dashboard.

The electronic circuitry allows the driver and passenger to share buttons causing different actions (e.g. window opening/closing, seat- and climate control) via the personal identification. Further, the electronic circuitry is served in rubber parts like tires, seals, labels, conveyor belts, etc. to check against wear and tear, measure, speed, distance, vibrations, and other physical forces or chemical reactions. The electronic circuitry is able to measure distance of a tire to a curb stone to protect a rim from damage.

Medical: The electronic circuitry is able to provide multiple applications in the medical industry. For example, the electronic circuitry is attached on a flexible carrier that acts as a label or sticker on an infusion bag. The electronic circuitry measures the level of the liquid inside the infusion bag and if the needle is still remaining inside a patient's arm (and causes alert if removed). The patient is placed on an alternating field emitting electrode (first electrode) inside a bed (or chair).

The patient may wear a wristband equipped with the electronic circuitry to send out detected vital signals and identification signals to allow a permanent health condition monitoring. The electronic circuitry is always on and requires no battery, the rate of failure is extremely low, especially that results may be repeated and verified countless times.

Further, the electronic circuitry is equipped with medical devices e.g. syringes, medication-packages or bottles, as well as identification batches for doctors and nurses. In this case, the electronic circuitry tracks/monitors activities like loading a syringe with medication and verifies the receiving patients. Further, the electronic circuitry is able to check the position of medical devices e.g. in an operation room, track the use. The tracking results may be stored in blockchains for the purpose of evidence.

Industrial Area: The electronic circuitry protects workers from accidents and ensure that the workers are wearing the electronic circuitry equipped protection devices like gloves, shoes, helmets, vests, goggles, etc. The electronic circuitry has identification codes, and further is able to track location of the worker, approaching critical zone, authorized worker only completing the required task, etc.

The electronic circuitry is able to control industrial processes and machines where the alternating electric field propagates over the machine. Further, the electronic circuitry is able to upgrade older machines to participate in modern industrial processes e.g. digital twin, blockchains, machine learning, artificial intelligence, etc. The electronic circuitry may also make robotic elements and cobots "feel (and avoid) obstacles and learn spatial constraints and boundaries.

Products: The electronic circuitry may also be attached to packages to monitor and instantly report changes inside or outside. The electronic circuitry detects consumers from a distance (e.g. 5 m) and identify consumers if they are carrying electronic circuitry e.g. on customer cards. Further, the electronic circuitry also contributes in real-time inventory of products and protect against theft and vandalism, as the electronic circuitry is able to detect movement and notify when the package is moved from one place to another without handled by authorized user.

Home: The electronic circuitry is useful in appliances like fridges, washing machines, dryers, cooking tops, air filters, climate control, and other smart devices. The electronic circuitry is utilized for not only operating the appliances but also controlling the features of the appliances. Further, the electronic circuitries result in saving time and cost by not having complicated programs, cables, wires, connectors, installation, labor, etc.

The electronic circuitry may also be attached to building structures like rebars covered in concrete, floors, ceilings, doors and windows. The electronic circuitry is able to replace switches, detect persons without compromising privacy. Further, the electronic circuitry helps monitoring (elderly) people, minors and animals.

AgriTech: The electronic circuitry is attached to the plants and trees to monitor the growth and resistance against bugs. The alternating electric field have many other positive features like supporting wound healing, fight against tumors, or repelling electro-sensitive animals from insects to sharks, etc.

Public Space: The electronic circuitry is able to make commuting easier and safer especially by replacing cameras. Further, the electronic circuitry is able to communicate about accidents, over the communication network. Furthermore, the electronic circuitry is able to detect and provide real-time traffic updates to other commuters.

The drawings and the forgoing description give examples of embodiments. Those skilled in the art will appreciate that one or more of the described elements may be very well combined into a single functional element. Alternatively, certain elements may be split into multiple functional elements. Elements from one embodiment may be added to another embodiment. For example, the orders of the processes described herein may be changed and are not limited to the manner described herein. Moreover, the actions of any flow diagram need not be implemented in the order shown; nor do all of the acts necessarily need to be performed.

Also, those acts that are not dependent on other acts may be performed in parallel with the other acts. The scope of embodiments is by no means limited by these specific examples. The components of the system including the devices and related technologies mentioned above are collectively used to improve performance of the analog computing.

Numerous variations, whether explicitly given in the specification or not, such as differences in structure, dimension, and use of material, are possible. Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

The invention claimed is:

1. A SmartDust system for contactless digital controlled serialized analog processing of analog values received from an object, the SmartDust system comprising:
    a hub unit comprising:
        an oscillator for generating a frequency;
        a first electrode connected to the oscillator to emit the frequency as an alternating electric field;
    at least one electronic circuitry attached to the object and capacitive coupled to the hub unit, each of the electronic circuitry comprising:
        a second electrode for receiving the emitted alternating electric field via the first electrode;
        a rectifier coupled to the second electrode for converting charges of the alternating electric field into a DC voltage;
        a buffer to store the DC voltage;
        a Schmitt trigger for converting the frequency into a system clock;
        a digital function block for performing digital logic operations;
        a sequencing unit coupled to the digital function block to store and perform switching instructions and the digital logic operations;
        an arrangement of transmission gates operating on the switching instructions from the sequencing unit;
        an arrangement of Sample & Hold units to sample and hold analog values under control of the sequencing unit;
        at least one input pad receives the analog values from the object and further the input pad provides the received analog values to the Sample & Hold units to generate sampled analog values;
        a differential unit to process the sampled analog values, further the differential unit communicates the processed analog values for further processing in a sequence to at least one of the Sample & Hold unit; and the digital function block;
        at least one digital analog output pad for providing the processed values received from at least one of the differential unit; and the digital function block to external components;
        an arrangement of analog units for configuring the differential unit with the switching instructions under control of the sequencing unit; and
        a first modulator coupled to at least one of the differential unit; and the digital function block to modulate the alternating electric field with the processed values.

2. The SmartDust system according to the claim 1, wherein the hub unit further comprising a controller for providing the switching instructions and the digital logic operations to the digital function block.

3. The SmartDust system according to claim 2, wherein the digital function block provides a unique identification code for each object in reach.

4. The SmartDust system according to claim 3, wherein the controller identifies the object by identifying the unique identification code.

5. The SmartDust system according to claim 1, wherein the hub unit further comprising a second modulator for modulating the alternating electric field with the switching instructions and the digital logic operations, wherein the first electrode emits the modulated alternating electric field to be received by the second electrode.

6. The SmartDust system according to claim 1, wherein the hub unit further comprising an interface to communicate with the first modulator to receive the processed values, further the interface communicates the receive processed values over a communication network.

7. The SmartDust system according to claim 1, wherein the electronic circuitry further comprising at least one digital input pad for receiving logic levels, instructions and parameters from external digital electronics.

8. The SmartDust system according to claim 7, wherein the electronic circuitry further comprising a power output for powering the external digital electronics.

9. The SmartDust system according to claim 7, wherein the digital function block controls the external digital electronics.

10. The SmartDust system according to claim 1 further comprising a detector for decoding the processed values received via the modulated alternating electric field from the first modulator.

11. The SmartDust system according to claim 10 wherein the detector is attached to the hub unit.

12. The SmartDust system according to claim 1 wherein the differential unit creates a Round Robin Loop with the Sample & Hold unit and the digital function block, under control of the sequencing unit.

13. The SmartDust system according to claim 1, wherein the rectifier provides ESD clamping to each input pad and each digital analog output pad.

14. The SmartDust system according to claim 1, wherein the electronic circuitry comprising a floating electrode.

15. The SmartDust system according to claim 14, further comprising a surface as a third electrode coupling with the floating electrode.

16. The SmartDust system according to claim 1, wherein each of the electronic circuitry powers, clocks, controls and communicates with the other connected electronic circuitries.

17. The SmartDust system according to claim 1 further comprising one or more infra-red light emitting diodes connected to the electronic circuitries for releasing warm optical signals.

* * * * *